United States Patent [19]

Ramun

[11] Patent Number: 5,552,179
[45] Date of Patent: Sep. 3, 1996

[54] METHOD FOR TREATING CONCRETE

[75] Inventor: John R. Ramun, Poland, Ohio

[73] Assignee: Allied Gator, Inc., Youngstown, Ohio

[21] Appl. No.: 491,407

[22] Filed: Jun. 16, 1995

[51] Int. Cl.$^6$ .................. B05D 7/24; B05D 1/36; C08K 3/00
[52] U.S. Cl. .............. 427/136; 427/393.6; 427/403; 427/407.1; 524/5
[58] Field of Search .................. 524/5; 427/136, 427/393.6, 403, 407.1

[56] References Cited

U.S. PATENT DOCUMENTS

| | | | |
|---|---|---|---|
| 689,622 | 12/1901 | Otto et al. | 106/33 |
| 1,453,457 | 5/1923 | Haldeman | 106/712 |
| 3,720,528 | 3/1973 | Jordon | 106/712 |
| 4,430,463 | 2/1984 | Mullenax | 524/5 |
| 4,732,816 | 3/1988 | Walters | 427/393.6 |
| 4,828,883 | 5/1989 | Ramun | 427/214 |
| 5,229,437 | 7/1993 | Knight | 427/393.6 |

*Primary Examiner*—Peter A. Szekely
*Attorney, Agent, or Firm*—Webb Ziesenheim Bruening Logsdon Orkin & Hanson, P.C.

[57] ABSTRACT

A concrete treating composition including an aqueous solution of a polymer binder and water is disclosed. The composition is added to unset concrete during various concrete finishing steps in a process to treat the upper region of the concrete and protect the finished concrete from staining, wear, erosion, damage from chemicals and weathering. In an alternative embodiment, a wetting agent is also added to the composition.

17 Claims, No Drawings

METHOD FOR TREATING CONCRETE

FIELD OF THE INVENTION

The present invention relates generally to methods for increasing the weatherability, flexibility, strength, stain resistance and chemical resistance of concrete by treating the unset concrete with a protective composition.

BACKGROUND OF THE INVENTION

Concrete is a construction material formed from a mixture of gravel, pebbles, broken stone or slag and sand in a mortar or cement mix. Concrete is prepared by mixing these dry components with water to form a pourable slurry. The concrete slurry normally is poured or placed into a lumber or metal frame and allowed to dry. The drying rate of unset concrete is often controlled to prevent cracking of the final concrete. Upon drying, the hardened concrete is useful for many surfaces including roads, sidewalks and interior or exterior floors.

Poured concrete, particularly exterior concrete, is subject to permanent staining by paint from nearby work areas, oil drips from vehicles and the like. Concrete is also subject to erosion from exposure to natural elements and is subject to dusting from wear caused by vehicles or feet traveling over the concrete. Concrete is also susceptible to spalling from salt and other road maintenance chemicals. It is known to protect poured concrete from the environment and chemicals by adding various materials to increase its durability and chemical resistance.

One approach for protecting concrete is described in U.S. Pat. No. 4,430,463, where the surface of a substance such as concrete is coated with an acrylic polymer cement coating. The coating composition is a wet mix of Portland cement, acrylic polymer, propylene glycol and a defoamer. A batch of the wet mix is prepared by first preparing three premixes, namely, (1) a premix of the cement and sand, (2) a water dispersion of an acrylic polymer, and (3) an aqueous solution of propylene glycol and a defoaming agent. The three premixes are then combined and mixed with water for three to four minutes. The consistency is varied by adding different amounts of water to obtain a desired consistency. Control of the consistency is important because the composition may be applied to the substrate by a variety of coating methods such as troweling or by spraying onto the substrate which can include set concrete, concrete block, wood panels, hardboards, metal panels, glass panels, and the like. The composition must carefully and evenly be applied to these surfaces. This coating composition requires several preparation steps, uses heavy materials (cement and sand) which are relatively difficult to transport, must be varied according to its application site, and is relatively labor intensive.

Control of the curing rate of freshly poured concrete also provides an opportunity to protect the end product. Methods and compositions used to retard the curing of concrete mixes are well known. Such compositions are generally sprayed onto the finished surface of freshly poured concrete and operate to decrease the evaporation rate of water from the wet mix, thus retarding the drying time of the concrete mix to form a better end product. Problems with retarding the curing rate to affect the final properties of concrete include substantial delays in the ability to use the concrete surface after pouring and costs attendant to such delays. Further, merely delaying curing does not necessarily strengthen the concrete and does not provide the concrete with a protective coating that is long lasting and can protect the concrete from weathering, erosion or chemical attack.

Further, materials for coating concrete must be transported to the job site and often must also be prepared at the job site with complex mixing operations resulting in increased costs, increased delays, and increased efforts. A need remains in the art for a simple method of increasing the durability and flexibility of poured concrete. A further need remains in the art for a concrete coating composition which is relatively easy to transport and can be prepared with minimal labor at the job site.

SUMMARY OF THE INVENTION

The present invention is directed to a method of treating freshly poured concrete with a protective composition to increase its durability and flexibility and provide resistance to chemicals and the environment. The method provides a protective composition integral with the upper portion of the concrete to form a protective region in the final concrete product. The method includes the steps of providing a binder which increases the flexibility and durability of the concrete, the binder being a polymeric material which is capable of forming an aqueous dispersion when mixed with water, mixing the binder with water to form an aqueous dispersion in which the ratio of the binder is 5–20 wt. % per weight of the aqueous dispersion, applying the aqueous dispersion of the binder and the water to a surface of unset concrete, effecting the penetration of the aqueous dispersion beneath the surface of the concrete to a desired depth, and allowing the aqueous dispersion to dry whereupon a protective coating is formed on the unset concrete. In a preferred embodiment, the binder is a vinyl acetate/ethylene copolymer. The aqueous dispersion is added to freshly poured concrete during straight edging, bull floating or brushing of the concrete or during a combination of these concrete finishing steps. In still another embodiment, a wetting agent is included in the aqueous dispersion. In a preferred embodiment, the wetting agent is propylene glycol and is present in a ratio of 0.01 to 0.02 wt. % per weight of said aqueous dispersion.

The composition used in this method is disclosed in my U.S. Pat. No. 4,828,883, which is incorporated herein by reference. As described therein, I developed a composition and method for encapsulating airborne asbestos. According to that invention, a wetting and encapsulation composition comprising propylene glycol and vinyl acetate/ethylene copolymer is applied to asbestos. The encapsulated asbestos is then hardened by mixing with an aqueous dispersion of cement and propylene glycol. Disposal of the asbestos formed into a hardened mass can be safely accomplished. I have now recognized that the materials I used to encapsulate asbestos can be used to coat and protect concrete. The novel composition coats, penetrates and binds concrete to a desired degree after the concrete has been initially poured. The protective composition imparts enhanced performance characteristics to the cured concrete by supplementing the upper portion of poured concrete in desired degrees of penetration. The inventive methods of applying the composition are selected to control the degree of penetration of the coating composition.

DETAILED DESCRIPTION OF THE PREFERRED EMBODIMENTS

The present invention is directed to a method for treating concrete after the concrete has been initially poured. In contrast to the conventional techniques of merely coating the exposed surface of concrete, the present invention provides for treatment of the upper portion of the concrete to form an integral, protective region of treated concrete in the final concrete product. This concrete treated by the method of the present invention attains greater durability, flexibility and chemical resistance than has been available previously.

The inventive method comprises in its most general form treating the freshly poured concrete with a protective composition which includes either a mixture of water and a binder or a mixture of water, a binder and a wetting agent. The wetting agent allows the aqueous solution to spread more easily across the concrete surface and penetrate into the concrete by reducing the surface tension of the solution. The binder is a polymeric material which increases the flexibility and durability of the concrete.

Where the wetting agent and binder are both added, they generally are mixed with the water in one step. For ease of mixing, the composition may be prepared by filling a container half full with water, adding the wetting agent and binder in ratios set out below, mixing well, and subsequently filling the balance of the container with water while continuing to mix until all components are thoroughly admixed. This two-step process is particularly useful when preparing large volumes, e.g. in a 55 gallon drum, and allows the practitioner of the inventive method to mix the wetting agent and binder into a lesser volume of water and once thoroughly admixed, to merely dilute the resulting solution to a desired final volume. One major advantage of the method of the present invention is that the wetting agent and binder can be mixed together in advance and this mixture can be carried to a job site in relatively small amounts and subsequently mixed with a larger volume of water at the job site. Moreover, the binder, which can be provided in a powder form, can be carried to the job site in a dry form and mixed with the proper amount of water at the job site. This results in significantly reduced transportation costs and efforts.

Another advantage of the method of the present invention is that it permits the practitioner to choose between admixing at the job site or choosing to premix the composition in advance. Mixing at the job site is to be preferred because when the composition is prepared at the job site, the wetting agent and binder either can be premixed or, more preferably still, added separately to the water in order to have flexibility in the relative amounts of wetting agent and binder used at each particular job site. The precise amount of the composition required for each job site can be prepared on location which then eliminates any problems with the shelf life of a pre-mixed composition. Because water is available at most job sites, the practitioner only needs to transport a mixing container, two relatively small quantities of additives and simple tools for mixing and applying the composition as described below.

The wetting agent is preferably present in concentrations of about 0.01–0.02 wt. % and, more preferably, about 0,013–0.015 wt. % of the final mixture. The binder is preferably present in concentration of about 5–20 wt. % and, more preferably, about 6–18 wt. % of the final mixture. The balance of the composition is water present in the range of about 80–95 wt. %.

Certain concrete compositions contain a wetting agent to enhance dispersion of materials through the wet concrete. When the composition of the method of the present invention is to be used with concrete compositions which already contain a wetting agent, only the binder is mixed with water in the stated concentrations and applied as described below.

While any wetting agent may be used with the method of the present invention, a preferable wetting agent is propylene glycol. The binder is preferably a vinyl acetate/ethylene copolymer. One example of a binder is Airflex RP-226 which is sold by Air Products and Chemicals, Inc. of Allentown, Pa.

METHODS OF APPLICATION

After the concrete has been poured, typically into a lumber or metal frame, three steps are usually performed to finish the concrete surface. These steps include straight edging the concrete, bull floating the concrete and brushing the concrete surface. Straight edging is performed, for example, by passing a 2'×4' piece of lumber over the surface of the poured concrete using the frame as a leveling guide. In bull floating, a wooden board or sheet of metal is drawn across the wet concrete surface to settle particulates (sand, gravel and the like) in the concrete mixture. A trowel may also be used to float smaller areas of the concrete in a similar fashion. Brushing is performed by sweeping a broom or the like over the concrete surface. The inventive composition may be added to the concrete during one or more of these three steps.

AFTER BRUSHING

When the protective composition is applied after brushing, a layer of the composition is applied by spraying or spreading the composition over the finished concrete surface until the surface attains a milky white color. The composition is allowed to soak into the concrete until the original color of the concrete returns. A second layer of the composition can be applied and allowed to soak into the concrete. If added protection of the concrete is required, a third layer may be applied using the same technique. The concrete then is allowed to dry.

AFTER STRAIGHT EDGING

When the protective composition is applied after straight edging but before bull floating and brushing, a layer of the composition is sprayed or spread over the leveled concrete surface until the surface attains a milky white color. The surface then is finished by bull floating and brushing and allowed to dry for about 30 to 45 minutes or longer depending on the water content of the concrete. After this drying period, the composition is again applied to the finished concrete surface as described in the preceding paragraph directed to application after brushing.

PRIOR TO STRAIGHT EDGING

The protective composition can be applied to the surface of freshly poured concrete before leveling by spraying or the like. The composition is mixed into about the first three inches of the poured concrete by a hoe, spade or the like. The concrete is then leveled by straight edging. Individual sections of the poured concrete can be worked one at a time by applying the composition to a section of the freshly poured concrete, mixing the composition into that section, straight edging that section and repeating the process on subsequent sections of the poured concrete. The composition can now simply be allowed to dry whereupon the protective layer will form. For a more thorough application, the treated, straight edged concrete is treated with a second application of the composition during the bull floating and brushing steps. A third application of the composition may also be applied to the finished concrete surface after brushing as described above to more thoroughly protect the final concrete product.

Although the invention has been described generally above, particular examples give additional illustration of the products and method steps typical of the present concrete coating composition and methods.

EXAMPLE 1

An aqueous dispersion of a protective composition was prepared by mixing 29 g propylene glycol and 12 kg Airflex RP-226 into approximately 25 gallons of water. The solution was mixed well, and an additional 25 gallons of water was added.

EXAMPLE 2

An aqueous dispersion of a protective composition was prepared by mixing 29g propylene glycol and 24kg Airflex RP-226 into approximately 25 gallons of water. The solution was mixed well, and an additional 25 gallons of water was added.

EXAMPLE 3

An aqueous dispersion of a protective composition was prepared by mixing 29 g propylene glycol and 39 kg Airflex RP-226 into approximately 25 gallons of water. The solution was mixed well, and an additional 25 gallons of water was added.

EXAMPLE 4

The compositions of Examples 1, 2 and 3 were each added to individual sections of freshly poured concrete as follows. After the concrete had been poured and the surface finishing had been completed in accordance with conventional concrete finishing practice in which the final finishing step is brushing, the composition was sprayed over the finished concrete surface, covering the concrete surface so that it acquired a milky white color. The protective composition was allowed to soak into the concrete and penetrate the concrete for one-half hour until the color of the concrete returned.

A second layer of the protective composition was applied until the milky white color visualization again was achieved. The coated concrete was then allowed to dry.

EXAMPLE 5

The protective compositions of Examples 1, 2 and 3 were applied to individual sections of freshly poured concrete as follows. The concrete was poured and the surface of the concrete was straight edged according to conventional concrete finishing practice. A first layer of the protective composition was sprayed onto the concrete surface until it acquired a milky white color. The concrete surface was then finished by bull floating and brushing techniques in accordance with conventional concrete finishing practice. The protective composition was allowed to dry and penetrate into the concrete surface for approximately 30–45 minutes. After the coating was dry, an additional second layer of the protective composition was applied using the procedure outlined in Example 4.

EXAMPLE 6

The protective compositions of Examples 1, 2 and 3 were applied to individual sections of freshly poured concrete as follows. Prior to leveling of the concrete using a straight edge, the protective composition was sprayed onto the area being worked and was mixed into the top three inches of the concrete as it was leveled out with straight edging. The concrete surface was then bull floated and brushed in accordance with conventional concrete finishing practice. After the protective composition dried, a second layer of the protective composition was applied using the procedure outlined in Example 4.

In each of Examples 4, 5 and 6, a third layer may be applied in accordance with Example 4 to more thoroughly protect the final concrete product.

Concrete which was treated with the compositions of Examples 1, 2 and 3 was tested in sidewalks and on exterior industrial concrete slabs over which heavy equipment travels. The protective composition prevented permanent staining from paint and oil drips from vehicles and prevented erosion from salt and other road maintenance chemicals. The protective composition also reduced the incidence of cracking or spalling of the treated concrete as compared to untreated concrete.

It will thus be seen that the concrete protective composition disclosed herein produces a protective material with unusual and highly desirable characteristics including prevention of staining from paint and oil or fuel drips, dusting from wear by vehicles traveling over the concrete, erosion from salt and other road maintenance chemicals, increased flexibility and reduced surface cracking. The material is relatively inexpensive to form, relatively easy to mix, relatively easy to apply and provides long-term protection to concrete surfaces.

Although the invention has been described with particularity in the above text and examples, the invention is only to be limited insofar as is set forth in the accompanying claims.

I claim:

1. A method of treating concrete containing a wetting agent to protect the upper region of the concrete comprising the steps of:
   a) providing a binder which increases the flexibility and durability of said concrete, said binder being a copolymer which is capable of forming an aqueous dispersion when mixed with water, wherein said binder is a vinyl acetate/ethylene copolymer;
   b) mixing said binder with water to form an aqueous dispersion, said aqueous dispersion consisting essentially of said binder and water, in which the ratio of said binder is 5–20 wt % per weight of said aqueous dispersion;
   c) applying said aqueous dispersion of said binder and said water to a surface of said concrete before said concrete sets;
   d) penetrating said aqueous dispersion beneath said surface of said concrete to a desired depth; and
   e) allowing said aqueous dispersion to dry whereupon an integral, protective region of treated concrete is formed in said concrete.

2. The method of claim 1 wherein said binder is in a dry powdered form prior to mixing said binder with water and further including the steps of:
   a) transporting said binder to a job site in said dry powdered form; and
   b) mixing said dry powdered binder with said water at said job site to form said aqueous dispersion.

3. The method of claim 1 wherein said step of mixing said binder with water further includes the steps of:
   a) adding said binder to a fraction of a total amount of said water which is to be added in order to form a concentrated aqueous dispersion;

b) mixing said concentrated solution to thoroughly blend said binder and said water; and c) diluting said concentrated dispersion with the remainder of said water to form said aqueous dispersion in which the ratio of said binder is 5–20 wt. % per weight of said aqueous dispersion.

4. The method of claim 1 wherein said steps of applying said aqueous dispersion to said surface of said concrete, penetrating said aqueous dispersion beneath said surface and allowing said aqueous dispersion to dry further include the steps of:

a) applying a first layer of said aqueous dispersion to a brush finished surface of said concrete until said surface assumes a milky white color;

b) allowing said aqueous dispersion to soak into the concrete until said surface of said concrete returns to its original color;

c) applying a second layer of said aqueous dispersion to the surface of said concrete in the same manner as said first layer; and d) allowing said aqueous dispersion to dry whereupon said protective region is formed in said concrete.

5. The method of claim 4 further including the steps of:

a) adding a third layer of said aqueous dispersion to the surface of said concrete in the same manner as said first layer; and b) allowing said third layer of said aqueous dispersion to dry whereupon said protective region is formed in said concrete.

6. The method of claim 1 wherein said steps of applying said aqueous dispersion to said surface of said concrete, penetrating aqueous dispersion beneath said surface and allowing said aqueous dispersion to dry further include the steps of:

a) straight edging a surface of freshly poured concrete;

b) applying a first layer of said aqueous dispersion onto said surface of said concrete after said surface has been straight edged until said straight edged surface attains a milky white color and before said surface of said unset concrete has been bull floated;

c) bull floating said surface of said concrete;

d) brush finishing said surface of said concrete;

e) allowing said first layer of said aqueous dispersion to dry;

f) applying a second layer of said aqueous dispersion to the surface of said concrete in the same manner as said first layer; and g) allowing said second layer of said aqueous dispersion to dry whereupon said protective coating is formed on said concrete.

7. The method of claim 1 wherein said steps of applying said aqueous dispersion to said surface of said concrete, penetrating said aqueous dispersion beneath said surface and allowing said aqueous dispersion to dry further include the steps of:

a) applying a first layer of said aqueous dispersion onto a surface of freshly poured concrete prior to straight edging of said surface;

b) admixing said aqueous dispersion into approximately the top three inches of said concrete prior to straight edging;

c) straight edging said surface of said concrete;

d) bull floating said surface of said concrete;

e) brushing said surface of said concrete; and f) allowing said aqueous dispersion to dry whereupon said protective region is formed in said concrete.

8. The method of claim 7 further including the steps of:

a) applying a second layer of said aqueous dispersion to said surface of said concrete after said straight edging and prior to said brushing of said surface of said concrete; and b) allowing said second layer of said aqueous dispersion to dry whereupon said protective region is formed in said concrete.

9. The method of claim 8 further including the steps of:

a) applying a third layer of said aqueous dispersion after said brushing of said surface of said concrete; and b) allowing said third layer of said aqueous dispersion to dry whereupon said protective region is formed in said concrete.

10. A method of treating concrete to protect the upper region of the concrete comprising the steps of:

a) providing a binder which increases the flexibility and durability of said concrete, said binder being a copolymer which is capable of forming an aqueous dispersion when mixed with water wherein said binder is a vinyl acetate/ethylene copolymer;

b) providing a wetting agent which allows said aqueous dispersion to spread easily across said surface of said concrete by reducing surface tension of said aqueous dispersion, and which is capable of forming an aqueous dispersion when mixed with water, wherein said wetting agent is propylene glycol;

c) mixing said binder and said wetting agent with water to form an aqueous dispersion, said aqueous dispersion consisting essentially of said binder, said wetting agent and water, in which the ratio of said binder is 5–20 wt. % per weight of said aqueous dispersion and in which the ratio of said wetting agent is 0.01 to 0.02 wt. % per weight of said aqueous dispersion;

d) applying said aqueous dispersion of said binder and said water to a surface of said concrete before said concrete sets;

e) penetrating said aqueous dispersion beneath said surface of said concrete to a desired depth; and f) allowing said aqueous dispersion to dry whereupon an integral, protective region of treated concrete is formed in said concrete.

11. The method of claim 10 wherein said binder is in a dry powdered form and said wetting agent is in a liquid form prior to mixing said binder and said wetting agent with water, and further including the steps of:

a) transporting said binder and said wetting agent to a job site in said dry powdered form; and b) mixing said binder and said wetting agent with water at said job site to form said aqueous dispersion.

12. The method of claim 10 wherein said step of mixing said binder and said wetting agent with water includes the additional steps of:

a) adding said binder and said wetting agent to a fraction of a total amount of said water which is to be added in order to form a concentrated aqueous dispersion;

b) mixing said concentrated solution to thoroughly blend said binder, said wetting agent and said water; and c) diluting said concentrated dispersion with the remainder of said water to form said aqueous dispersion in which the ratio of said binder is 5–20 wt. % per weight of said aqueous dispersion and the ratio of said wetting agent is 0.01 to 0.02 wt. % per weight of said aqueous dispersion.

13. The method of claim 10 wherein said steps of applying said aqueous dispersion to said surface of said concrete, penetrating said aqueous dispersion beneath said surface and allowing said aqueous dispersion to dry further include the steps of:

a) applying a first layer of said aqueous dispersion to a brush finished surface of said concrete until said surface assumes an even, milky white color;
   b) allowing said aqueous dispersion to soak into the concrete until said surface of said concrete returns to its original color;
   c) applying a second layer of said aqueous dispersion to the surface of said concrete in the same manner as said first layer;
   d) applying a third layer of said aqueous dispersion to the surface of said concrete in the same manner as said first layer; and
   e) allowing said aqueous dispersion to dry whereupon said protective region is formed in said concrete.

14. The method of claim 10 wherein said steps of applying said aqueous dispersion to said surface of said concrete, penetrating said aqueous dispersion beneath said surface and allowing said aqueous dispersion to dry further include the steps of:

a) straight edging a surface of freshly poured concrete;
   b) applying a first layer of said aqueous dispersion onto said surface of said concrete after said surface has been straight edged until said straight edged surface attains a milky white color and before said surface of said unset concrete has been bull floated;
   c) bull floating said surface of said concrete;
   d) brush finishing said surface of said concrete;
   allowing said first layer of said aqueous dispersion to dry;
   f) applying a second layer of said aqueous dispersion to the surface of said concrete in the same manner as said first layer; and
   g) allowing said second layer of said aqueous dispersion to dry whereupon said protective region is formed in said concrete.

15. The method of claim 10 wherein said steps of applying said aqueous dispersion to said surface of said concrete, penetrating said aqueous dispersion beneath said surface and allowing said aqueous dispersion to dry further include the steps of:

a) applying a first layer of said aqueous dispersion onto a surface of freshly poured concrete prior to straight edging of said surface;
   b) admixing said aqueous dispersion into approximately the top three inches of said concrete prior to straight edging;
   c) straight edging said surface of said concrete;
   d) bull floating said surface of said concrete;
   e) applying a second layer of said aqueous dispersion to said surface of said concrete;
   f) brushing said surface of said concrete; and
   g) allowing said aqueous dispersion to dry whereupon said protective region is formed in said concrete.

16. The method of claim 15 further including the steps of:

a) applying a third layer of said aqueous dispersion after said brushing of said surface of said concrete; and
   b) allowing said third layer of said aqueous dispersion to dry whereupon said protective region is formed in said concrete.

17. A method of treating concrete to protect the upper region of the concrete comprising the steps of:

a) providing a binder which increases the flexibility and durability of said concrete, said binder being a vinyl acetate/ethylene copolymer which is capable of forming an aqueous dispersion when mixed with water;
   b) providing a wetting agent which allows said aqueous dispersion to spread easily across said surface of said concrete by reducing surface tension of said aqueous dispersion, said wetting agent being propylene glycol and which is capable of forming an aqueous dispersion when mixed with water;
   c) mixing said binder and said wetting agent with water to form an aqueous dispersion in which the ratio of said binder is 6–8 wt. % per weight of said aqueous dispersion and in which the ratio of said wetting agent is 0.013 to 0.015 wt. % per weight of said aqueous dispersion;
   d) applying said aqueous dispersion of said binder and said water to a surface of said concrete before it sets;
   e) penetrating said aqueous dispersion beneath said surface of said concrete to a desired depth; and
   f) allowing said aqueous dispersion to dry whereupon an integral, protective region of treated concrete is formed in said concrete.

* * * * *

UNITED STATES PATENT AND TRADEMARK OFFICE
CERTIFICATE OF CORRECTION

PATENT NO. : 5,552,179
DATED : September 3, 1996
INVENTOR(S) : John R. Ramun

It is certified that error appears in the above-indentified patent and that said Letters Patent is hereby corrected as shown below:

Column 3 Line 54 "0,013" should read --0.013--.

Claim 14 Line 37 Column 9 before "allowing" insert --e)--.

Claim 17 Line 36 Column 10 "6-8" should read --6-18--.

Signed and Sealed this

Nineteenth Day of November, 1996

Attest:

BRUCE LEHMAN

*Attesting Officer*        *Commissioner of Patents and Trademarks*